United States Patent
Wolfgang et al.

(10) Patent No.: US 8,666,623 B2
(45) Date of Patent: Mar. 4, 2014

(54) METHOD FOR CONTROL AND/OR REGULATION OF A MOTOR VEHICLE AUTOMATIC TRANSMISSION ACCORDING TO DRIVING ROUTE SLOPE

(75) Inventors: Werner Wolfgang, Ravensburg (DE); Matthias Winkel, Weingarten (DE); Bertram Wengert, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 929 days.

(21) Appl. No.: 12/513,299

(22) PCT Filed: Oct. 12, 2007

(86) PCT No.: PCT/EP2007/060885
§ 371 (c)(1),
(2), (4) Date: May 1, 2009

(87) PCT Pub. No.: WO2008/052870
PCT Pub. Date: May 8, 2008

(65) Prior Publication Data
US 2010/0017082 A1    Jan. 21, 2010

(30) Foreign Application Priority Data
Nov. 4, 2006    (DE) .......................... 10 2006 052 106

(51) Int. Cl.
*G06F 7/00*    (2006.01)
*G06F 17/00*    (2006.01)
*G06F 19/00*    (2011.01)

(52) U.S. Cl.
USPC .................. 701/65; 701/80; 701/51; 702/154

(58) Field of Classification Search
USPC ......... 701/65, 22, 70, 51, 55, 23, 38, 446, 45, 701/495, 58, 67, 80; 477/45, 74, 107, 124, 477/172, 174, 180, 72, 93; 711/102, 162; 33/521; 702/154
See application file for complete search history.

(56) References Cited

U.S. PATENT DOCUMENTS

| 4,471,437 | A |   | 9/1984  | Yoshino et al. |
| 5,428,531 | A | * | 6/1995  | Hayafune ........................ 701/65 |
| 5,716,301 | A |   | 2/1998  | Wild et al. |
| 5,803,865 | A | * | 9/1998  | Harada et al. ................. 477/119 |
| 5,832,400 | A |   | 11/1998 | Takahashi et al. |
| 6,067,489 | A | * | 5/2000  | Letang et al. ................... 701/36 |

(Continued)

FOREIGN PATENT DOCUMENTS

| DE | 33 34 719 A1 | 4/1985 |
| DE | 38 31 449 A1 | 3/1990 |

(Continued)

*Primary Examiner* — Tuan C. To
*Assistant Examiner* — Isaac Smith
(74) *Attorney, Agent, or Firm* — Davis & Bujold, PLLC; Michael J. Bujold (57) ABSTRACT

A method for controlling and/or regulating an automatic transmission of a vehicle, depending on the driving route slope in which a winding mountain pass road detection is carried out, depending upon a topography of the driving route, in such a way that a time for either setting or resetting winding mountain pass road detection is determined.

27 Claims, 3 Drawing Sheets

(56) References Cited

U.S. PATENT DOCUMENTS

| | | | |
|---|---|---|---|
| 6,106,434 A | 8/2000 | Ibamoto et al. | |
| 6,374,172 B1* | 4/2002 | Yamaguchi et al. | 701/90 |
| 6,507,780 B2* | 1/2003 | Graf | 701/51 |
| 6,516,261 B2 | 2/2003 | Ohashi et al. | |
| 6,611,747 B1* | 8/2003 | Schmitt et al. | 701/84 |
| 6,701,224 B1* | 3/2004 | Klusemann | 701/1 |
| 6,859,703 B2* | 2/2005 | Fuhrer et al. | 701/38 |
| 6,932,441 B2* | 8/2005 | Hellmann et al. | 303/177 |

FOREIGN PATENT DOCUMENTS

| | | |
|---|---|---|
| DE | 44 40 706 A1 | 5/1996 |
| DE | 195 28 625 A1 | 2/1997 |
| DE | 198 21 725 A1 | 11/1998 |
| DE | 199 39 938 A1 | 3/2000 |
| DE | 100 40 549 A1 | 3/2002 |
| DE | 101 35 824 A1 | 7/2003 |
| DE | 10 2004 040 351 A1 | 3/2006 |
| GB | 2 329 731 A | 3/1999 |

* cited by examiner

PARAMETERIZATION EXAMPLE

| zlr_start_passf | 1000 | | | | | | |
|---|---|---|---|---|---|---|---|
| steig_passf_incr (slope) | -20% | -10% | -3% | 0% | 3% | 10% | 20% |
| set_passf_incr | 10 | 5 | 1 | 0 | 0 | -1 | -5 |
| res_pasff_incr | -5 | -1 | 0 | 0 | 1 | 5 | 10 |

METHOD FOR CONTROL AND/OR REGULATION OF A MOTOR VEHICLE AUTOMATIC TRANSMISSION ACCORDING TO DRIVING ROUTE SLOPE

This application is a National Stage completion of PCT/EP2007/060885 filed Oct. 12, 2007, which claims priority from German patent application serial no. 10 2006 052 106.4 filed Nov. 4, 2006.

FIELD OF THE INVENTION

The invention involves a method for controlling and/or regulating an automatic transmission of a vehicle depending on the slope of the route driven.

BACKGROUND OF THE INVENTION

Methods are known from vehicle technology for controlling and/or regulating an automatic transmission of a vehicle depending on the slope of the route slope driven. In an automatic transmission with automatic gear ratio selection it is customary to select the desired speeds, for example, from specific input variables, such as, for example, from the accelerator position and the driver command connected to it. The speeds are varied therein depending on the current uphill grades or current driving resistances of the vehicle, the needed power requirement in the vehicle is determined in this way.

It has been shown, that the current uphill grade reflects only an instantaneous value and not a driving environment, such as, for example, if the vehicle is driving on a winding mountain pass road. A gear ratio selection corresponding to level ground is thus carried out in the known processes, while the vehicle travels over a short flat distance as it drives on a winding mountain pass road, since this corresponds to the current grade. The engine speed expected for driving over mountains is thus not engaged.

A method is known and a device for controlling the shift point of an automatic transmission depending on the slope of the route driven are known from patent publication DE 44 40 706 A1. So-called oscillating shifts are effectively prevented with this method. For this purpose, the current slope value which is utilized for controlling the vehicle transmission is strongly filtered in the process. A time offset between the utilized slope value and the current slope is achieved by means of filtering of the respectively current slope values. The aforementioned problems can occur again, through this measure, if the time offset is exceeded.

An electronic operating control system for a motor vehicle powertrain is known, from patent publication DE 38 31 449 C2. This electronic operating control system also utilizes operating state variables, in order to take into consideration the topographic conditions of the driving route during control. The known operating control system is also unable to prevent the described problem.

SUMMARY OF THE INVENTION

It is therefore the object of the invention to propose a method of the kind described above with which an improved and as realistic as possible actuation of the automatic transmission depending on the topography of the driving route is made possible.

Figure 4:
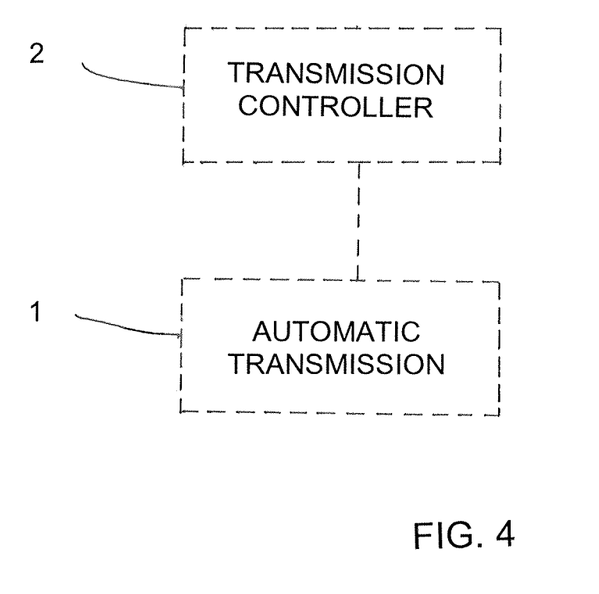
FIG. 4 Diagrammatically shows a controller which performs the method for controlling an automatic transmission according to the invention.

In the proposed method for controlling and/or regulating an automatic transmission 1 of a vehicle with a transmission controller 2 depending on the slope of the driving route (FIG. 4), the topography of the driving route is at least intermittently monitored and the determined values are assessed, in order to be able to determine as accurately as possible the exact point in time at which the vehicle is actually located on an uphill grade similar to a winding mountain pass road or the like, in order to take this into consideration in the actuation of the transmission.

Information regarding the driving environment or driving route on which the vehicle is located can be made available in this way by means of the method according to the invention, for example, if the vehicle is driving over level ground or on a winding mountain pass road. In contrast with the known methods, monitoring of the driving route has initially no influence on the pitch value utilized for speed determination in the method according to the invention. Only if a winding mountain pass road is detected or if a winding mountain pass road detection is reset, is influence exerted on the speed determination in the automatic transmission.

The possibilities of how the method will exert influence on the actuation of the vehicle, if a winding mountain pass road is detected or if a winding mountain pass road detection is reset, are varied. According to a further development of the invention, predetermined functions can be activated or deactivated depending on the detected point in time for setting or resetting the winding mountain pass road detection. Functions, such as those via an ECO or a POWER mode shift, can be realized in this way with the advantage, that this takes place independent of the driver in the process according to the invention. Highly uneconomic speeds on level ground due to operators errors, can accordingly be prevented in the vehicle.

It is also possible, that further reactions may be linked to the winding mountain pass road detection signal according to the invention, for example, a shift of the complete driving program, other speed requirements by the selection of other characteristic lines or other characteristic fields and/or the addition of offsets. Other functionalities, such as, for example, shift speed limits, shift speeds, or the like, can furthermore be activated or also reparameterized.

An advantageous embodiment of the method according to the invention can provide, that the setting and resetting of the winding mountain pass road detection is determined depending on a driving resistance of the vehicle and/or depending on a pitch angle of the driving route. Depending on the field of application, the algorithm on which the method according to the invention is based can only take into consideration either the driving resistance or the pitch angle. In specific fields of application, even a combination of driving resistance and pitch angle or also the additional consideration of other parameters can make particularly optimal actuation of the automatic transmission possible.

Independent of whether the driving resistance or the pitch angle is utilized as the parameter for setting a winding mountain pass road detection, it is initially necessary to define a first upper limit value and a second lower limit value, wherein the first limit value indicates the value of the driving resistance or the pitch angle at which the winding mountain pass road detection would be set, if the vehicle is located on this driving route for a period of time predetermined by a counter. If the driving resistance or pitch angle drops below the second limit value, the counter is frozen, that is, the counter remains at its value, until the first limit value is exceeded. Only if the first limit value is again exceeded and the counter assumes the value zero or a predeterminable reference value is the bit winding mountain pass road set.

When the parameters of driving resistance and pitch angle are combined, the first limit value is preferably connected with an OR function, wherein the two limit values are preferably connected with an AND function. It is likewise possible to connect the first limit value with an AND function, wherein the two limit values are connected with an AND function or the first limit values are connected with an OR function, while the second limit values are connected with an OR function. The values for the respective limit values can be selected depending on the field of application.

A further development of the invention provides, that a first and a second limit value are also determined, in order to prevent setting of winding mountain pass road detection. If the driving resistance or the pitch angle drops below the first limit value drops and the counter, utilized in the aforementioned embodiment for setting a winding mountain pass road driving detection, has already been started, a second time counter can be started to prevent the setting and can be frozen, when the driving resistance or the pitch angle exceeds a second limit value. As soon as the second time counter for prevention of the setting of winding mountain pass road detection has reached the value zero or a predetermined reference value, both time counters are initialized.

A combined detection can also be achieved with this mode of operation by connecting the first limit values of the driving resistance or the pitch angle with an AND function and the second limit values with an OR function. It is likewise possible to connect the first limit values with an AND function, while the second limit values are connected with an AND function or the first limit values are connected with an OR function, and the second limit values are connected with an OR function.

In order to reset an already set winding mountain pass road driving detection, it can be provided in the process according to the invention, that the respective conditions for setting the winding mountain pass road detection must be present, wherein the first limit value and the second limit value, respectively, are interchanged. It is likewise possible to utilize other suitable values for the corresponding limit values. In this way, the time counter utilized for setting the winding mountain pass road detection is started, when the driving resistance or the pitch angle drops below the second lower limit value. As soon as the driving resistance or pitch angle rises above the first limit value, the time counter is frozen. If the time counter reaches the value zero or a predeterminable reference value, the bit reset winding mountain pass road is set. A combined detection with the driving resistance and the pitch angle is also conceivable, if the winding mountain pass road detection is reset.

The process according to the invention also provides, according to a next embodiment, a possibility for preventing resetting of the winding mountain pass road detection. For this purpose, a first and a second limit value are defined. If the driving resistance or pitch angle rises above the first limit value and the time counter utilized for setting winding mountain pass road detection has already been started, a second time counter is also started which is also utilized for preventing the setting of winding mountain pass road detection. As soon as the driving resistance or pitch angle drops below a second limit value, the time counter that was just started is frozen. If this time counter reaches the value zero or a predeterminable reference value, both time counters are initialized and signal winding mountain pass road remains set. A combined detection with the driving resistance and the pitch angle is also possible with this embodiment.

Within the scope of a further development, at least one of the time counters can be incremented or decremented, not with constant step widths, but in a particularly advantageous way depending on the current driving resistance or pitch angle values. Achieved in this way is the advantage, that specific parameters can be omitted and the process according to the invention is thus further simplified.

In a next embodiment of the invention, the driving route or a combination of time and driving route can also be utilized instead of the time, in order to carry out winding mountain pass road detection. It is also particularly advantageous, if the method can be carried our for several route conditions, such as, for example, driving in a valley, driving on a plain, driving on a slightly winding mountain pass road, and driving on a steep mountain.

In order to prevent loss of the obtained signals and values caused by an interruption in driving to loss of the obtained signals and values, it can be provided within the scope of another embodiment of the invention, that the values of the current condition are stored, when the ignition is switched off or when the signal "ignition off" is detected. When the ignition is switched on or when the signal "ignition on" is detected, the stored values of the latest condition can again be loaded.

A further simplification of the method according to the invention can be achieved by utilizing only a time counter and a few parameters or characteristic lines in the method. A reduced function of the method according to the invention can be realized with two parameters, wherein a limit value of the pitch angle and a stay value are necessary. A stay valve is defined as a period of time or a distance during which the limit value of the pitch angle is over-exceeded or under-exceeded.

A second possible embodiment of the method according to the invention can provide, that winding mountain pass road detection can be carried out via the length of time on an uphill grade or on a downhill grade of the vehicle. Winding mountain pass road detection can thus be carried out independent of elevational change that has been overcome. Characteristic lines and characteristic fields are utilized in this advantageous embodiment variation, in order to correspondingly assess the topography of the driving route. A marker z_passf can be either set or reset based on this evaluation.

According to a further development of the invention, a time counter or the like can be utilized, which starts counting downward or upward from a predeterminable start value, for example, 1000 to zero or zero to 1000. Counting downward or upward from the start value is carried out by means of increments or decrements predetermined by the respective characteristic lines or characteristic fields depending on the uphill grade and the downhill grade. The start value can be reduced on the basis of the different signs of the increments or decrements or can be increased again depending on the driving route. When the start value of the predeterminable reference value is reached, for example, the value zero or 1000, either winding mountain pass road detection is set or winding mountain pass road detection is reset. The counter is thereafter set again to the start value and the specification of the increments or decrements is switched over to the respective characteristic line.

Any values can be selected depending on the application field for the increments or decrements of the characteristic lines required for this embodiment variation. The increments or decrements can assume values of the uphill grade between minus 20% and 20%. The increments and decrements of the characteristic lines allocated to the uphill grade increments or uphill grade increments can be allocated values of, for example, between 10 and minus 15, in order to set winding mountain pass road detection and reset winding mountain pass road detection.

BRIEF DESCRIPTION OF THE DRAWINGS

The invention will be explained in greater detail below with reference to the enclosed figures.

In the drawings.

DETAILED DESCRIPTION OF THE PREFERRED EMBODIMENTS

Figure 1:
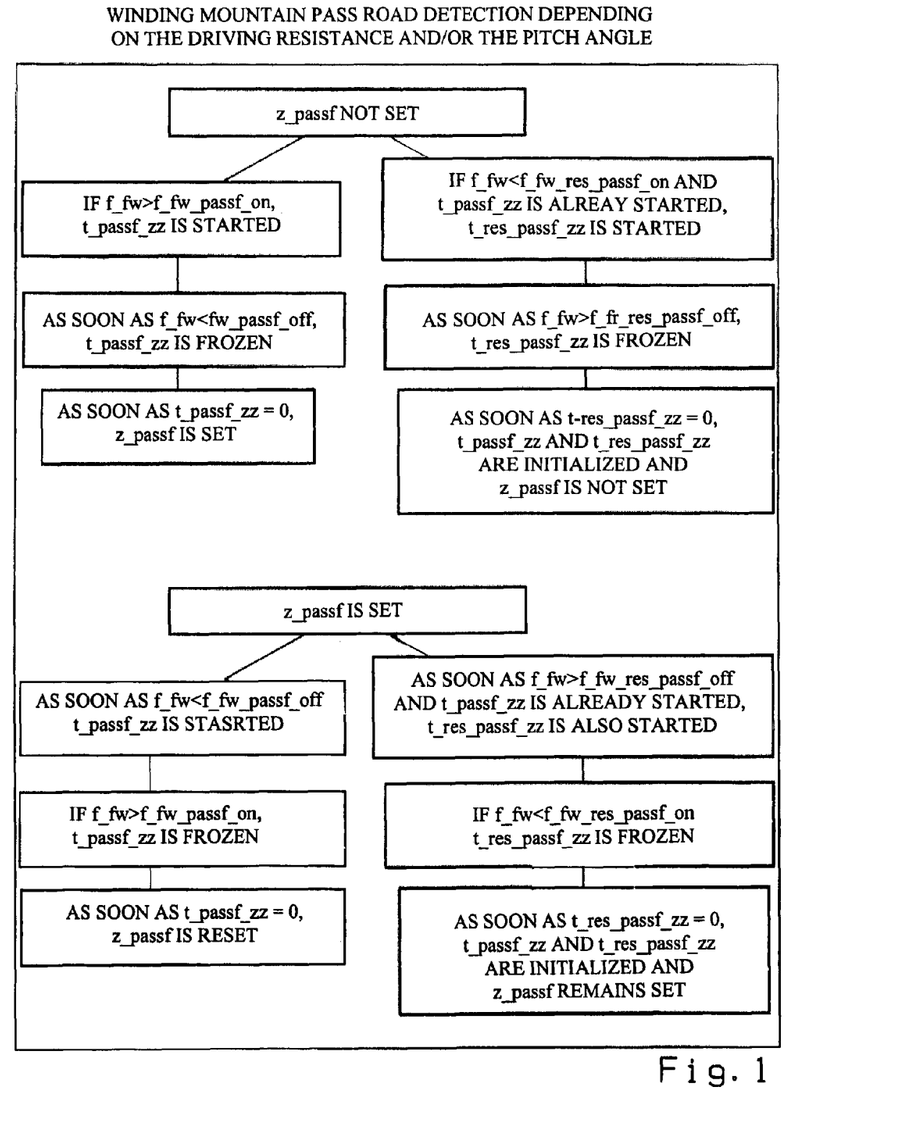
FIG. 1 Shows a flow diagram of a first possible embodiment of the method with winding mountain pass road detection via the driving resistance and/or the pitch angle.

FIG. 1 shows, as an example, a possible sequence of a first embodiment of the method according to the invention, wherein the principle is merely depicted on the basis of the driving resistance f_fw. The pitch angle alpha_hang can also be utilized as parameter with the same design for winding mountain pass road detection instead of the driving resistance f_fw.

A first upper limit value f_fw_passf_on and a second limit value f_fw_passf_off are defined, in order to set winding mountain pass road detection. If the driving resistance rises above the first limit value f_fw_passf_on, a first time counter t_passf_zz is started, and the first time counter t_passf_zz is frozen as soon as the driving resistance f_fw drops below the second limit value F_fw_passf_off. If the time counter t_passf_zz reaches the value zero, winding mountain pass road detection is set.

The first limit value alpha_hang_passf_on and the second limit value alpha_hang_passf_off apply as parameters for winding mountain pass road detection depending on the inclination. In the combined detection, the _on limit values are connected with an OR function and the _off values are connected with an AND function.

A first limit value f_fw_res_passf_on and a second limit value f_fw_res_passf_off for the driving resistance f_fw are defined as parameters, in order to prevent the setting of winding mountain pass road detection. If the driving resistance f_fw drops below the first limit value f_fw_res_passf_on and the first time countert_passf_zz has already been started, a second time countert_res_passf_zz is started and is frozen as soon as the driving resistance f_fw rises above the second limit value f_fw_res_passf_off. As soon as the second time counter t_res_passf_zz reaches the value zero, both time counters t_passf_zz, t_res_passf_zz are initialized.

The first limit value alpha_hang_res_passf_on and the second limit value alpha_hang_res_passf_off apply as parameters for the prevention of the setting of winding mountain pass road detection depending on the pitch angle. In the combined detection, the _on limit values are connected with an AND function and the _off limit values are connected with an OR function.

As can also be seen in the flow diagram of FIG. 1, the same algorithm that is used for resetting winding mountain pass road detection is utilized for setting winding mountain pass road detection, but with interchanged limit values. In the combined detection, the _on limit values are connected with an OR function and the _off limit values are connected with an AND function.

The same algorithm used for preventing setting winding mountain pass road detection is also utilized for preventing resetting winding mountain pass road detection, but the limit values are hereby also interchanged. In the combined detection, the _on limit values are connected with an AND function and the _off limit values are connected with an OR function.

Different functionalities can be triggered depending on the determined point in time for setting or resetting winding mountain pass road detection to achieve improved actuation of the automatic transmission.

Figure 2:
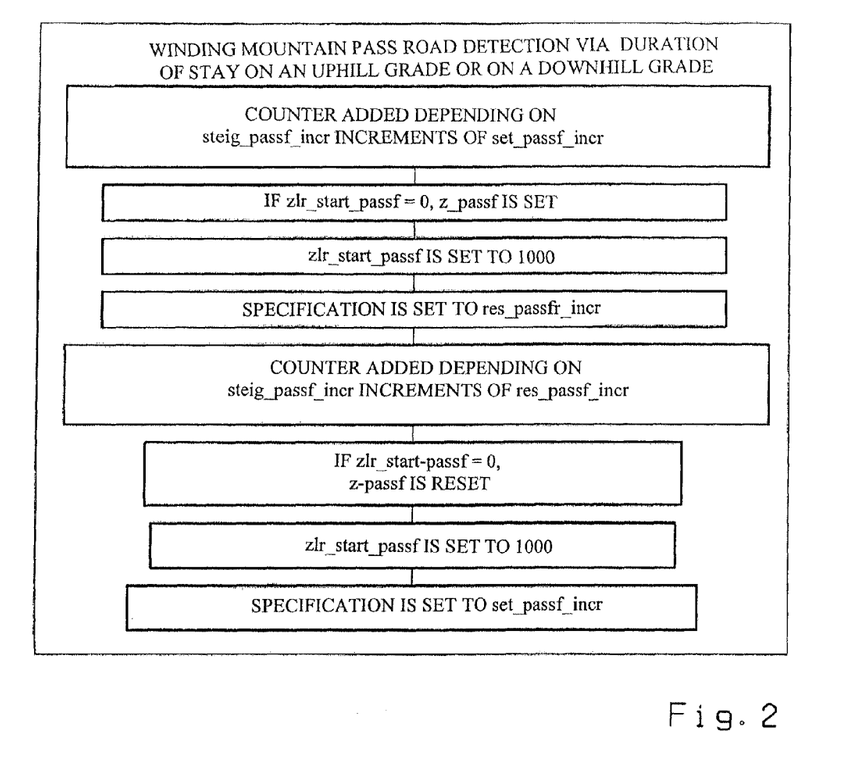
FIG. 2 Shows a flow diagram of a second possible embodiment of the invention via the duration of stay.

FIG. 2 shows an exemplary sequence of a second embodiment of the method according to the invention. The values of the parameterization example disclosed as example in FIG. 3 can be utilized in this embodiment.

The flow diagram of FIG. 2 shows, that the counter increases by increments that are predetermined via the characteristic line set_passf_incr, wherein the counter is upwardly limited by means of the start value zlr_start_passf. If the counter reaches the value zero, the marker z_passf is first set. Specific functionalities for influencing the actuation of the automatic transmission are also activated in this embodiment by setting winding mountain pass road detection.

The counter is thereafter reset to the start value zlr_start_passf. Specification of the increments is switched over to the characteristic line res_pasff_incr, in order to reset winding mountain pass road detection.

In order to reset winding mountain pass road detection, the counter again increases by the increments predetermined via the characteristic line res_passf_incr, wherein the counter is again upwardly limited by the start value zlr_start_passf. If the counter reaches the value zero, the marker z_passf is reset. The functionality that was activated, when winding mountain pass road detection was set, is again deactivated at this point to adapt actuation of the automatic transmission to the changed driving route.

The counter is set to the start value zlr_start_passf and the specification of increments is again switched to the characteristic line set_passf_incr.

It should be noted, that the start value zlr_start_passf can also be increased in each mode, since the characteristic line for setting winding mountain pass road detection set_passf_incr and the characteristic line for resetting winding mountain pass road detection res_passf_incr can also have respective positive values as increments. Winding mountain pass road detection is taken into consideration, when the vehicle drives over changing terrain.

Figure 3:
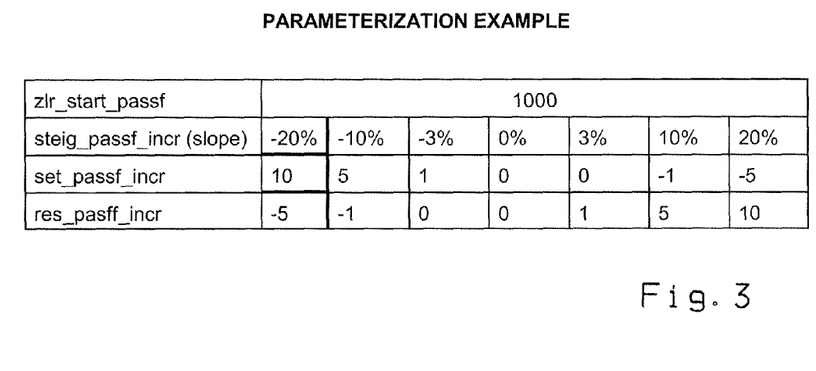
FIG. 3 Shows a table with a parameterization example for the second embodiment variation of FIG. 2.

A value set_passf_incr of zero is obtained, for example, with an activated characteristic line for setting winding mountain pass road detection set_passf_incr with an uphill grade of 3%, if the predetermined values are utilized in the previously described embodiment of the invention shown in FIG. 3. This value is added to the start value. A value of minus 5 is obtained from the characteristic line set_passf_incr, if the vehicle reaches, for example, an uphill grade of 20%. This value is added again to the start value. The start value zlr_start_passf is correspondingly reduced in this way.

The principle is shown in this example. If the vehicle drives for a long period of time on an uphill grade, the start value zlr_start_passf is consistently reduced, until it reaches the value zero for setting winding mountain pass road detection. If the marker z_passf is set, a switchover to the characteristic line res_passf_incr is carried out and the start value zlr_start_passf is reset to 1000, as mentioned. The start value z_start_passf is influenced according to the same previously described principle, in order to again reset winding mountain pass road detection. If the vehicle is on a downhill grade with a pitch of minus 20%, for example, the allocated value is taken from the characteristic line res_passf_incr, namely minus 5. The start value zlr_start_passf is reduced in this way. If the vehicle is located for a specific period of time on a downhill grade, the start value zlr_start_passf will reach the value zero at some point, and winding mountain pass road detection is reset.

| Reference Characters | |
|---|---|
| alpha_hang | Pitch angle |
| f_fw | Driving resistance |
| f_fw_passf_on | First limit value driving resistance<br>Set winding mountain pass road detection |
| f_fw_passf_off | Second limit value driving resistance<br>Reset winding mountain pass road detection |
| alpha_hang_passf_on | First limit value pitch angle<br>Set winding mountain pass road detection |
| alpha_hang_passf_off | Second limit value pitch angle<br>Reset winding mountain pass road detection |
| f_fw_res_passf_on | First limit value driving resistance<br>Prevent setting of winding mountain pass road detection |
| f_fw_res_passf_off | Second limit value driving resistance<br>Prevent resetting of winding mountain pass road detection |
| alpha_hang_res_passf_on | First limit value pitch angle<br>Prevent setting of winding mountain pass road detection |
| alpha_hang_res_passf_off | Second limit value pitch angle<br>Prevent resetting of winding mountain pass road detection |
| t_passf_zz | First time counter |
| t_res_passf_zz | Second time counter |
| set_passf_incr | Characteristic line for setting winding mountain pass road detection |
| res_passf_incr | Characteristic line for resetting winding mountain pass road detection |
| zlr_start_passf | Start value |
| z_passf | Set or reset marker of winding mountain pass road |
| steig_passf_incr | Slope characteristic line |

The invention claimed is:

1. A method of managing an automatic transmission of a vehicle with a transmission controller depending on a driving route incline, the method comprising the steps of:
detecting a winding mountain pass road with the transmission controller, depending on a topography of the driving route,
determining, via the transmission controller, a point in time for either setting or resetting the winding mountain pass road detection;
either setting or resetting the winding mountain pass road detection, via the transmission controller, based on parameters, the parameters being defined as at least one of a driving resistance (f_fw) of the vehicle and a pitch angle (alpha) of the driving route;
defining, via the transmission controller, a first limit value (f_fw_passf_on, alpha_hang_passf_on) and a distinct second limit value (f_fw_passf_off, alpha_hang_passf_off) of the parameters, the first limit value being greater than the distinct second limit value;
starting, via the transmission controller, a first time counter (t_passf_zz) when a current value of the parameters rises above the first limit value (f_fw_passf_on, alpha_hang_passf_on), and freezing the first time counter (t_passf_zz) when the current value of the parameters drops below the distinct second limit value (f_fw_passf_off, alpha_hang_passf_off);
setting or resetting the winding mountain pass road detection further depending on a duration of time the vehicle is on one of an uphill grade and a downhill grade;
relating the pitch angle of the driving route to a value on a slope characteristic line;
either determining an associated increment or decrement value from values of a setting characteristic line when the winding mountain pass road detection is currently reset or determining the associated increment or decrement value from values of a resetting characteristic line when the winding mountain pass road detection is currently set, the values of the setting characteristic line decreasing as the pitch angle of the driving route increases and the values of the resetting characteristic line increasing as the pitch angle of the driving route increases; and
managing, via the transmission controller, the automatic transmission based on whether the winding mountain pass road detection is set or reset.

2. The method of claim 1, further comprising the step of either activating or deactivating a predetermined function of the vehicle, depending on the determined point in time.

3. The method of claim 1, further comprising the step of using only the driving resistance of the vehicle as the parameters and the first limit value (f_fw_passf_on) and the distinct second limit value (f_fw_passf_off) of the driving resistance (f_fw) of the vehicle for detecting the winding mountain pass road.

4. The method of claim 3, further comprising the step of starting the first time counter (t_passf_zz), when the current value of the driving resistance (f_fw) rises above the first limit value (f_fw_passf_on) and freezing the first time counter (t_passf_zz), when the current value of the driving resistance (f_fw) drops below the distinct second limit value (f_fw_passf_off).

5. The method of claim 4, further comprising the step of setting the winding mountain pass road detection when the first time counter (t_passf_zz) reaches either a value of zero or a predeterminable reference value.

6. The method of claim 1, further comprising the step of using only the pitch angle as the parameters, and the first limit value (alpha_hang_passf_on) and the distinct second limit value (alpha_hang_passf_off) of the pitch angle for detection of the winding mountain pass road.

7. The method of claim 6, further comprising the step of starting the first time counter (t_passf_zz), when the current value of the pitch angle (alpha) rises above the first limit value (alpha_hang_passf_on), and freezing the first time counter (t_passf_zz) when the current value of the pitch angle (alpha) drops below the distinct second limit value (alpha_hang_passf_off).

8. The method of claim 7, further comprising the step of setting the winding mountain pass road detection, when the first time counter (t_passf_zz) reaches either a value of zero or a predeterminable reference value.

9. The method of claim 1, further comprising the step of resetting the winding mountain pass road detection, when respective conditions for setting the winding mountain pass road detection are present, and interchanging the first limit value (f_fw_passf_on, alpha_hang_passf_on) of the parameters with the distinct second limit value (f_fw_passf_off, alpha_hang_passf_off) of the parameters.

10. The method of claim 1, further comprising the steps of defining the parameters as being the driving resistance (f_fw) of the vehicle and the pitch angle (alpha) of the driving route, defining first and second limit values for the driving resistance (f_fw) of the vehicle and defining first and second limit values for the pitch angle (alpha) of the driving route; and
connecting the first limit values (f_fw_passf_on, alpha_hang_passf_on) by an OR function such that the first time counter is started when a current value of the driving resistance rises above the first limit value of the driving resistance OR when a current value of the pitch angle rises above the first limit value of the pitch angle, and connecting the distinct second limit values (f_fw_passf_off, alpha_hang_passf_off) by an AND function such that the first time counter is frozen when the current value of the driving resistance drops below the second limit value of the driving resistance AND when the current value of the pitch angle drops below the second limit value of the pitch angle, to either set or reset the winding mountain pass road detection.

11. The method of claim 4, further comprising the step of one of
defining a first resistance reset limit value (f_fw_res_passf_on) and a distinct second resistance reset limit value (f_fw_res_passf_off) for the driving resistance (f_fw), and
defining a first pitch reset limit value (alpha_hang_res_passf_on) and a distinct second pitch reset limit value (alpha_hang_res_passf_off) for a pitch angle (alpha) to prevent setting of the winding mountain pass road detection.

12. The method of claim 11, further comprising the step of starting a second time counter (t_res_passf_zz), when the current value of the driving resistance (f_fw) drops below the first resistance reset limit value (f_fw_res_passf_on) and the first time counter (t_passf_zz) is already started, and
freezing the second time counter (t_res_passf_zz) when the current value of the driving resistance (f_fw) rises above the distinct second resistance reset limit value (f_fw_res_passf_off).

13. The method of claim 12, further comprising the step of initializing the first time counter (t_passf_zz) and the second time counter (t_res_passf_zz), when the second time counter (t_res_passf_zz) reaches either a value of zero or a predeterminable reference value.

14. The method of claim 7, further comprising the step of defining a first pitch reset limit value (alpha_hang_res_passf_on) and a distinct second pitch reset limit value (alpha_hang_res_passf_off) for a pitch angle (alpha) of the driving route to prevent setting of the winding mountain pass road detection.

15. The method of claim 14, further comprising the step of starting a second time counter (t_res_passf_zz) when the current value of the pitch angle (alpha) drops below the first pitch reset limit value (alpha_res_passf_on) and the first time counter (t_passf_zz) is already started, and
freezing the second time counter (t_res_passf_zz) when the current value of the pitch angle (alpha) rises above the distinct second pitch reset limit value (alpha_hang_res_passf_off).

16. The method of claim 15, further comprising the step of initializing the first time counter (t_passf_zz) and the second time counter (t_res_passf_zz) when the second time counter (t_res_passf_zz) reaches one of a value of zero and a predeterminable reference value.

17. The method of claim 11, further comprising the step of preventing resetting of the winding mountain pass road detection by interchanging the first resistance reset limit value with the distinct second resistance reset limit value for the driving resistance and interchanging the first pitch reset limit value with the distinct second pitch reset limit value for the pitch angle (alpha).

18. The method of claim 11, further comprising the step of preventing setting of the winding mountain pass road detection depending on the current value of the driving resistance (f_fw) and a current value of the pitch angle (alpha), by connecting the first resistance and the first pitch reset limit values with an AND function such that the first time counter is started when the current value of the driving resistance rises above the first resistance reset limit value of the driving resistance AND when the current value of the pitch angle rises above the first pitch reset limit value of the pitch angle, and connecting the distinct second resistance and the second pitch reset limit values with an OR function such that the first time counter is frozen when the current value of the driving resistance drops below the distinct second resistance reset limit value of the driving resistance OR when the current value of the pitch angle drops below the second pitch reset limit value of the pitch angle.

19. The method of claim 15, further comprising the step of one of incrementing or decrementing the first time counter (t_passf_zz) and the second time counter (t_res_passf_zz) depending on the current value of the pitch angle.

20. The method of claim 1, further comprising the step of utilizing one of a driving route and a combination of time and the driving route as another parameter for the winding mountain pass road detection.

21. The method of claim 1, further comprising the step of utilizing several driving route conditions as further parameters for the winding mountain pass road detection.

22. The method of claim 1, further comprising the step of, when an ignition is switched off, storing, via the transmission controller, a current route condition and loading the current route condition again upon turning on the ignition.

23. The method of claim 1, further comprising the step of adding the associated increment or decrement value to a counter value of the first time counter to determine a subsequent counter value, the first time counter initiates counting from a starting counter value (zlr_start_passf).

24. The method of claim 23, further comprising the step of one of setting and resetting a marker (z_passf) when the subsequent counter value of the first time counter reaches either a value of zero or a predetermined reference value.

25. The method of claim 24, further comprising the step of setting the first time counter to the starting counter value (zlr_start_passf) when the marker is one of set or reset.

26. The method of claim 23, further comprising the step of reversing an order of the associated increment or decrement values when switching from the setting characteristic line (set_passf_incr) for setting the winding mountain pass road detection to the resetting characteristic line (res_passf_incr) for resetting the winding mountain pass road detection.

27. A method of performing one of an open-loop and closed-loop control of an automatic transmission of a vehicle with a transmission controller on the basis of the angle of inclination of a route, wherein a route-detection process is carried out on the basis of the topography of the route in such a way that a time for setting or resetting a detecting element for detecting a journey through a pass is determined, and the setting or the resetting of the detecting element for detecting a journey through a pass is determined on the basis of at least one of a travel resistance (f_fw) of the vehicle and an angle of gradient (alpha) of the route, the method comprising the steps of:

in order to detect a journey through a pass, defining, via the transmission controller, first and second limiting values for each of the travel resistance (f_fw) and the angle of gradient (alpha), the first limiting value of the travel resistance being greater than the second limiting value of the travel resistance, and the first limiting value of the angle of gradient being greater than the second limiting value of the angle of gradient, if at least one of a current value of the travel resistance (f_fw) rises above the first limiting value of the travel resistance and a current value of the angle of gradient (alpha) rises above the first limiting value of the angle of gradient, activating, via the transmission controller, a first counter (t_pass_zz) to start counting, beginning at a starting value, adjusting, via the transmission controller, a counter value of the first counter incrementally by adding or subtracting preset counter values depending on whether the detecting element for detecting a journey through a pass is being set or reset, the preset counter values also being variable depending on the current value of the angle of the gradient of the route;

selecting the preset counter value to add to the counter value of the first counter from a setting characteristic line if the first counter is being set and selecting the preset counter value to add to the counter value of the first counter from a resetting characteristic line if the first counter is being reset;

if at least one of the current value of the travel resistance (f_fw) drops below the second limiting value of the travel resistance and the current value of the angle of gradient (alpha) drops below the second limiting value of the angle of the gradient, freezing, via the transmission controller, the first counter (t_pass_zz) to suspend counting; and setting or resetting, via the transmission controller, the detecting element when the counter value of the first counter equals a set value.

* * * * *